Dec. 5, 1961   W. F. MORGAN, JR   3,011,744
FIXTURES FOR LUMINOUS TUBES
Filed June 17, 1959
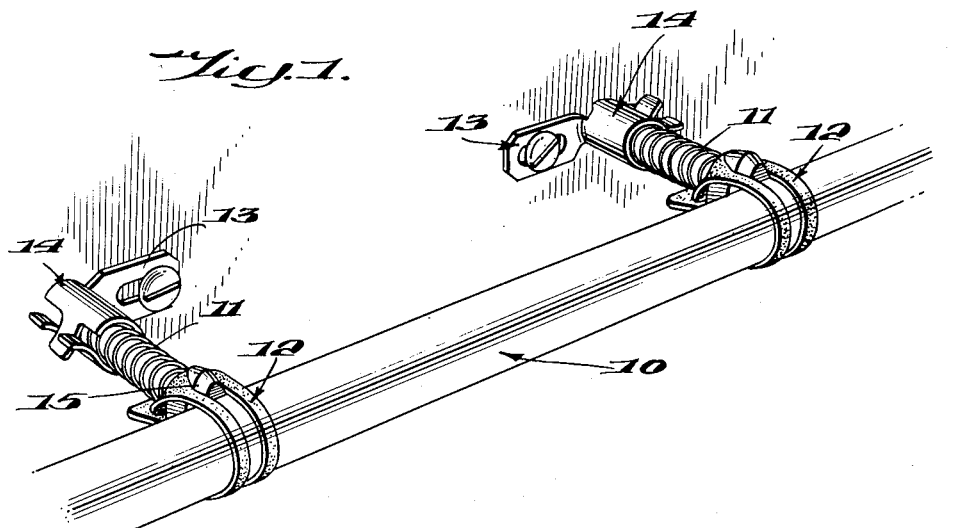
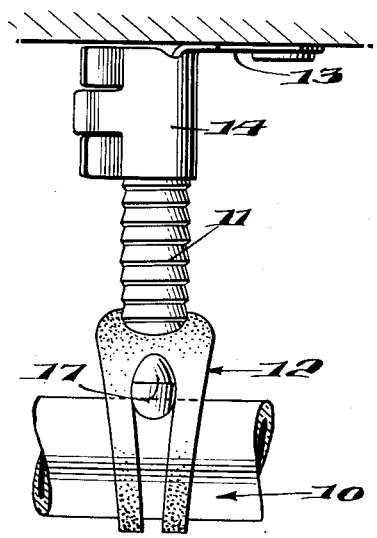
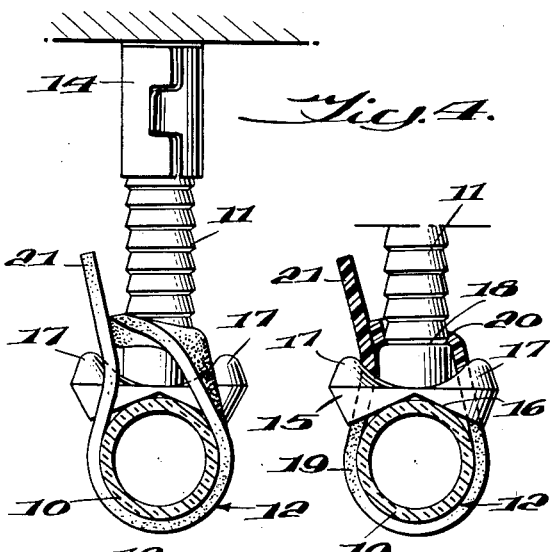
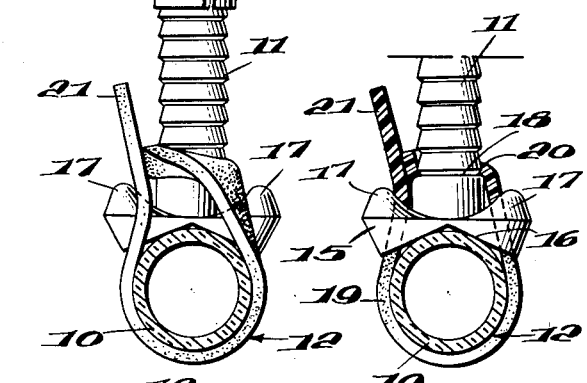
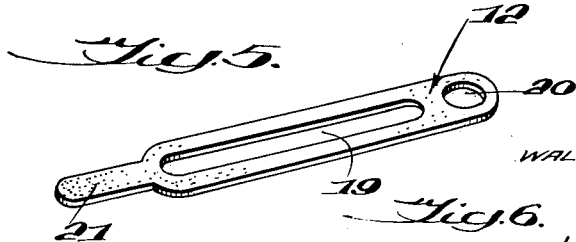
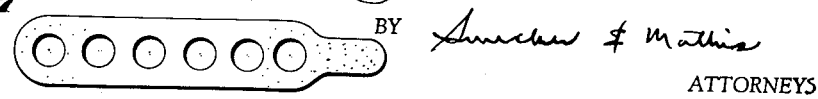
INVENTOR
WALTER FRANK MORGAN, JR.
BY
ATTORNEYS

United States Patent Office 3,011,744
Patented Dec. 5, 1961

3,011,744
FIXTURES FOR LUMINOUS TUBES
Walter Frank Morgan, Jr., 245 S. University Ave.,
Provo, Utah
Filed June 17, 1959, Ser. No. 820,882
4 Claims. (Cl. 248—50)

This invention relates to fixtures for luminous tubes, and more particularly, my invention relates to a fastener for securing a neon tube, or the like, to its supporting bracket post.

Neon tubes are supported on posts anchored to a bracket which is secured to a wall or ceiling, or other type of support, depending upon the use being made of the tube. Metal brackets are commonly employed for releasably anchoring posts for supporting neon tubes. The posts are usually of glass, each having a saddle at its outer end against which a tube may rest, and said saddle terminates at each end in a hook-like knob which may be employed for tying the tube to the post. It has been customary heretofore to secure the tube to the post by a short length of wire which is looped about the tube and post hooks, and its free ends are twisted together to tighten slightly the wire for holding the associated tube.

I have found that with the wire fasteners in use, the tubes have a tendency to become loosened, causing tube failures and excessive expenditures for repair. Also, in coastal areas, the wire fastener is subject to high corrosion, which sometimes causes the same to break, and thus the associated tube becomes unfastened from its supporting post. Also, with the wire fastener, the person securing the wire has only one hand free to twist the end of said wire for tightening it about the tube, the other hand being used to hold the tube. This makes the work awkward and definitely slows up mounting of the tubes.

One object of this invention is to provide a tube fastener which will eliminate each of the above disadvantages.

Another object of the invention is to improve the construction of fixtures for such luminous tubes.

More specifically, the purpose of the invention is to provide a fastener which is not subject to corrosion; and which will have more contact with the associated tube than a wire, and thus more firmly hold the tube in place. Also, I provide a fastener which may be applied in such a manner that both hands of the worker can be used at the point of application of the fastener, and thus shorten the time for mounting tubes. Moreover, it is my purpose to provide a fastener which is strong, simple, and durable, and which also is inexpensive to manufacture.

In the accompanying drawings:

FIG. 1 is a perspective view showing the use of a tube fastener of this invention for tying a tube to a pair of posts anchored by wall brackets;

FIG. 2 is a fragmentary view when looking down on the mounting shown in FIG. 1;

FIG. 3 is a fragmentary cross sectional view further illustrating the application of my fastener;

FIG. 4 is a detail sectional view of the tube mounting and showing the structure of the fastener as well as its application;

FIG. 5 is a perspective of the fastener strap of this invention; and

FIG. 6 is a perspective view of a modification thereof.

A neon tube is indicated at 10, supported on a suitable base by a plurality of posts 11, and secured to the posts 11 by fasteners 12.

Each post 11 is usually formed of glass, or other insulating material, and may be provided with spiral or annular ribs, as shown, which terminate at the post head 15, forming a shoulder 18.

Each post 11 is releasably anchored to a wall bracket 13 by an integral clamp 14. The clamp is provided with tabs, as shown, which can be pressed apart to open the clamp sufficiently to slide a post in position. The bracket 13 is secured to a support by a screw placed in a slot which permits longitudinal movement for adjusting the position of the associated bracket. Any suitable supporting or fastening means may be used, as desired.

The free end of the post terminates in a head 15 which is formed with a saddle 16, as shown, for seating the tube 10. Each head 15 terminates in hook-like protrusions 17 on opposite sides thereof to be used for attaching a tube 10 to the post 11.

Referring to FIG. 5, the fastener 12 consists of a semi-flexible strip, initially flat, having an elongated slot 19, or a series of holes 19′ (FIG. 6), a hole or opening 20 adjacent one end, and at the other end, a tab or handle-like portion 21. The fastener 12 should be made of strong and durable material which is impervious to the acids that it may need to endure in service; it must also offer high resistance to alkaline substances for reducing corrosion to a minimum. It may be formed of elastic, plastic or other suitable material. A transparent plastic may be used if desired as shown in FIGS. 1 and 2. The fastener should have almost an unlimited life, irrespective of weather elements, acids, and other deteriorating substances to which it may be subjected.

In applying the fastener 12, assuming that the brackets 13 are secured in place, each post is then provided with a fastener 12. This is done by slipping the anchored end of the post through the opening 20 of the fastener strap and bringing the same up against the post shoulder 18. The post can now be slipped into the anchor clamp 14. Next, the tube 10 may be positioned in its saddle 16, and the strap grasped by the handle 21 and secured, as illustrated, to the post for holding the tube in its saddle. In brief, the strip is brought over the tube 10, as shown, and made to engage the hook 17 on the opposite end of the saddle, as shown in FIGS. 2, 3 and 4. It will be noted that both hooks 17 of a post are in the slot 19 of the fastener 12, or one hook in each of a pair of holes 19′ in FIG. 6. The series of holes 19′ enables the fastener to be used for tubes of different sizes, and also to compensate for any possible stretch of the strip. Thus, the fastener remains securely in place, and holds the tube 10 tightly on the post 11.

With the use of my fastener, I have found that the labor involved in securing neon tubes for any particular installation is reduced as much as 85%. The tubes are held firmly because more surface contact is had between the tube and fastener. Also, corrosion is substantially eliminated, and thus, tube failure and repair is likewise reduced to a minimum. The fastener being of semi-elastic material, permits the easy tying of the tubes without harm thereto, and also materially increases the speed at which a tube can be tied to its saddle or mounting.

While the invention is illustrated in certain embodiments, it is recognized that variations and changes may be made therein without departing from the invention as set forth in the claims.

I claim:

1. In combination, a post support for luminous tubes having a saddle at its outer end and adapted to be anchored at its inner end, hooks projecting from the outer end of said post adjacent said saddle, and a tube fastener comprising a semi-elastic strap having a hole in one end thereof encircling the post adjacent the saddle, said strap fastener extending from the post in a loop over the saddle to enclose a tube therein and with the free end of the strap engaging one of the hooks to hold said tube firmly within said saddle.

2. In combination, a post support for luminous tubes having a saddle at its outer end and adapted to be anchored at its inner end, hooks projecting from the outer end of said post adjacent said saddle, and a tube fastener comprising a semi-elastic strap having a hole in one end thereof encircling the post adjacent the saddle, said strap being secured to each of said hooks and being adapted to engage a tube therebetween to hold said tube firmly within said saddle.

3. In combination, a post support for luminous tubes having a saddle at its outer end and adapted to be anchored at its inner end, hooks projecting from the outer end of said post adjacent said saddle, and a tube fastener comprising a semi-elastic strap having a hole in one end thereof encircling the post adjacent the saddle, a tab at the other end thereof providing gripping means, said strap having an elongated slot, one end of said slot engaging one of said hooks, the other end of said slot engaging the other hook, and said strap being adapted to engage a tube in the saddle to hold said tube securely therein.

4. In combination, a post support for luminous tubes having a saddle at its outer end and adapted to be anchored at its inner end, hooks projecting from the outer end of said post adjacent said saddle, and a tube fastener comprising a semi-elastic strap having a hole in one end thereof encircling the post adjacent the saddle, a tab at the other end thereof providing gripping means, said strap having a plurality of openings therein, one of said openings secured to a first one of said hooks and another of said openings engaged with the other of said hooks, and said strap adapted to engage a tube therebetween to hold said tube firmly in said saddle.

References Cited in the file of this patent

UNITED STATES PATENTS

| | | |
|---|---|---|
| 1,817,268 | Rohlfs | Aug. 4, 1931 |
| 2,067,818 | Bell | Jan. 12, 1937 |
| 2,330,835 | Miller | Oct. 5, 1943 |
| 2,629,814 | Brown | Feb. 24, 1953 |

FOREIGN PATENTS

| | | |
|---|---|---|
| 459,970 | Italy | Oct. 11, 1950 |
| 796,222 | France | Jan. 17, 1936 |
| 1,011,299 | France | Apr. 2, 1952 |